3,083,068
PROCESS FOR DYEING AND PRINTING CELLU-
LOSE TEXTILE MATERIALS WITH SOLUBLE
LEUCO ESTER VAT DYESTUFFS
Kurt Weber and Paul Ulrich, Basel, Paul Hugelshofer,
Otelfingen, Zurich, and Heinrich Bruengger and Max
Staeuble, Basel, Switzerland, assignors to Ciba Limited,
Basel, Switzerland, a company of Switzerland
No Drawing. Filed Aug. 25, 1960, Ser. No. 51,800
Claims priority, application Switzerland Aug. 27, 1959
12 Claims. (Cl. 8—35)

This invention provides an especially advantageous process for dyeing or printing textile materials, especially textile materials of cellulose, with leuco-vat dyestuffs in which the hydroxyl groups formed by reducing the keto-groups are esterified with a carboxylic acid or sulfonic acid of which the acyl radical contains at least one group imparting solubility in water, wherein, at any stage of the dyeing or printing process prior to the oxidation, the ester of the leuco-vat dyestuff is treated with an alkali and a reducing agent.

The leuco-vat dyestuffs used in the process may belong to the anthraquinone, perylene or indigoid series. As examples there may be mentioned acylaminoanthraquinones such as 1:5-dibenzoylaminoanthraquinone, a condensation product of one molecular proportion of isophthaloyl chloride with two molecular proportions of 1-amino-anthraquinone or 1-amino-5-benzoylaminoanthraquinone, or one molecular proportion of cyanuric chloride with two molecular proportions of 1- or 2-aminoanthraquinone and one molecular proportion of aniline, or of one molecular proportion of 1:3-dichloroquinazoline with two molecular proportions of 1-aminoanthraquinone, and also leuco-vat dyestuffs containing more highly condensed ring systems, such as, pyranthrone, anthanthrone, pyrenequinone or dibenzpyrenequinone and also leuco-vat dyestuffs that contain a fused-on or fused-in heterocyclic ring, for example, indanthrone, flavanthrone, N:N-diethyldipyrazole-anthrone, 5-benzoylaminoanthrapyrimidine or perylenetetracarboxylic acid diimides or perinone dyestuffs, obtainable by condensing naphthalene tertcarboxylic acid with two molecular proportions of ortho-phenylene diamine. Among the indigoid dyestuffs there may be mentioned indigo, tetrabromindigo and thioindigo. At least two oxo-groups in the rings of these dyestuffs must be in the reduced condition and esterified with a carboxylic acid or sulfonic acid of which the acyl residue contains at least one group imparting solubility in water, for example, quaternary ammonium group or advantageously at least one sulfonic acid group. The acyl radical may be, for example, the radical of an aliphatic, heterocyclic or more especially an aromatic acid. Of special interest are acyl radicals of the formula:

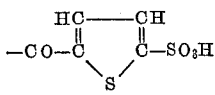

in which $n$ is the whole number 1, 2 or 3. As examples of acyl radicals there may be mentioned the radicals of the formulae:

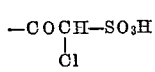 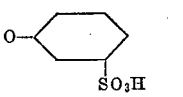

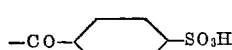 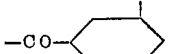

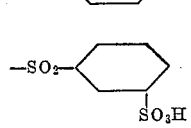 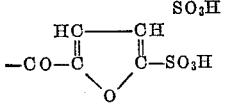

and

The esters of the leuco-vat dyestuffs can be made by the known general methods, for example, by reacting the leuco-vat dyestuffs with the appropriate benzoic acid sulfonic acid halide in the presence of a tertiary base. The reduction of the vat-dyestuffs and the esterification thereof can be carried out in a single stage by reacting the vat-dyestuffs with the benzoic acid sulfohalide, for example, in pyridine in the presence of a reducing agent, especially copper powder. The esters of the leuco compounds are soluble in water and are very stable in substance and also in neutral solution.

However, the esters of the leuco compounds split up rather easily into the free leuco-compounds in the presence of alkalis, more especially alkali metal hydroxides.

As reducing agents there may be used strong reducing agents, such as sodium hydrosulfite or thiourea dioxide, or a weaker reducing agent such as sodium sulfide, sodium hydrosulfide, glucose or hydrazine. The proportion of the reducing agent may vary within wide limits. In general, a considerably smaller proportion of reducing agent suffices than is required for dyeing with vat dyestuffs by the usual process. The dyeing may be carried out, for example, by the exhaustion method. In this case the material to be dyed is treated in a solution of the ester of the leuco compound containing the alkali, more especially, an alkali metal hydroxide, and the reducing agent, advantageously at a moderately raised temperature, more especially within the range of 20° C. to 90° C. The oxidation of the leuco-compound fixed on the fiber and the after-treatment, such as rinsing and soaping at the boil, may be carried out by the methods usual in vat dyeing.

An especially advantageous form of the process is one in which an aqueous solution of the ester of the leuco-compound is applied to the material by padding. For this purpose the material to be dyed is impregnated with a solution of the ester of the leuco-compound, advantageously in the cold or at a moderately raised temperature, and the impregnated material is squeezed in the usual manner. Advantageously the squeezing is carried out until the material retains 50 to 140% of its weight of dyestuff solution. The treatment with alkali and a reducing agent is carried out after the impregnation, advantageously after drying the material. For this purpose the pre-treated material may be impregnated with an aqueous solution containing the alkali and the reducing agent, then squeezed, and steamed in order to fix the dyestuff. The after-treatment, that is to say, the rinsing with cold water, the oxidation, if desired, with the addition of an oxidizing agent, for example, hydrogen peroxide or sodium perborate, acidification and after-soaping at the boil, is carried out in the usual manner.

The dyeing may also be carried out by the single bath method, that is to say, the material may be padded in the same bath with the ester of the leuco compound, the alkali and the reducing agent. Instead of carrying out the fixation by steaming the material or heating in the dry state, the fixation may be carried out by passing the impregnated material through a molten metal, for example, Wood's alloy.

In the process of the invention the ester of the leuco compound may be applied to the material by printing, instead of by impregnation. In this case there is used a printing color which contains, in addition to the ester of the leuco compound, additions customarily used in printing with vat-dyestuffs, such as potassium carbonate, hydro sulfite and a thickening agent.

By the process of this invention excellent dyeings and prints are produced on textile materials, and especially textile materials of cellulose. The process is also suitable for dyeing textile materials composed of polyester fibers or mixed fabrics of polyester fibers and cellulose fibers.

It is known to use sulfobenzoyl esters of leuco-vat dyestuffs for dyeing textile materials of cellulose (see United States Patent No. 1,903,871, issued April 18, 1933, to Walter Mieg et al.). However, in the process of that specification the ester of the leuco compounds is split up in the presence of an oxidizing agent. The dyeings produced by that process fall far short of satisfying modern requirements.

On the other hand, the dyeings produced by the process of this invention are distinguished by their high tinctorial strength and excellent level character.

The following examples illustrate the invention, the parts and percentages being by weight unless otherwise stated, and the relationship of parts by weight to parts by volume being the same as that of the kilogram to the liter.

*Example 1*

14 parts of the dyestuff prepared as described in Example 1 of German specification 697,431, issued October 14, 1940, to I. G. Farbenindustrie A.G., Frankfurt am Main, Germany, by condensing dimethoxydibenzanthrone with benzoic acid-meta-sulfochloride in pyridine with addition of copper powder, are dissolved in 1000 parts of water. With this solution a cotton fabric is impregnated in a manner such that its weight shows an increase of 75%, and then dried. The fabric is then impregnated with a solution containing per liter 50 parts by volume of sodium hydroxide solution of 30% strength and 35 parts of sodium hydrosulfite, squeezed to a weight increase of 100%, steamed for ½ to 2 minutes at 100° C., thoroughly rinsed in cold water, oxidized at 40° C. with a solution containing per liter 4 parts by volume of hydrogen peroxide of 30% strength, rinsed, acidified with a solution containing per liter 4 parts by volume of acetic acid of 40% strength, rinsed and soaped at the boil. A strong green dyeing is obtained which has excellent fastness properties.

A probably identical dyestuff having equal tinctorial properties can be prepared in the following manner:

A paste consisting of 2.5 parts of Bz-2:Bz-2'-dimethoxydibenzanthrone, 5.0 parts of an aqueous solution of 20% strength of the condensation product of 1 mol of oleyl alcohol with about 20 mols of ethylene oxide, and 16.5 parts of water was diluted with 80 parts of water and 20 parts of an aqueous solution of 20% strength of the above-mentioned condensation product. 20 parts of concentrated sodium hydroxide solution and 4 parts of sodium hydrosulfite were then added and the whole was vatted under nitrogen at 40 to 50° C. (duration of the vatting: about 30 minutes). The reaction mixture was then cooled to 0° C., a solution in 50 parts of acetone of 15 parts of the reaction product of benzoyl chloride and sulfur trioxide was then added dropwise within 1 hour and the whole was stirred under nitrogen at 0° C. until a specimen dissolved in water retained its red color on addition of sodium hydroxide solution. The reaction mixture was then diluted with 100 parts of water, undissolved material was filtered off, and the leuco ester was precipitated from the filtrate with sodium chloride and dried under vacuum at 40° C.

*Example 2*

0.3 part of the dyestuff used in Example 1 is dissolved in 50 parts of water heated to 60° C. The resulting red solution is poured into a solution heated to 60° C. of 6 parts by volume of sodium hydroxide solution of 30% strength and 1.2 parts of sodium hydrosulfite in 350 parts of water, and 10 parts of cotton are immediately thereafter immersed in the liquor and dyed for 45 minutes at 60 to 70° C. On completion of the dyeing the cotton is rinsed in flowing cold water until complete oxidation has been achieved, then acidified, rinsed and soaped at the boil. A strong green shade is obtained which has excellent fastness properties.

An identical dyeing can be produced with the dyestuff prepared by the process of German specification 719,198, issued April 1, 1942, to I. G. Farbenindustrie A.G., Frankfurt am Main, Germany, Example 1, by condensing dimethoxydibenzanthrone with isophthaloyl chloride in pyridine with addition of copper powder.

An identical result is obtained when in the first paragraph thiourea dioxide is used instead of sodium hydrosulfite.

*Example 3*

0.5 part of the dyestuff prepared as described in Example 3 of German specification 697,431, loc. cit., by condensing tetrabromoindigo with benzoic acid-meta-sulfochloride in pyridine with addition of iron powder, is dissolved in 50 parts of water at 30° C. The resulting solution is poured into a solution heated to 30° C. of 2 parts by volume of sodium hydroxide solution of 30% strength and 1.2 parts of sodium hydrosulfite in 350 parts of water; 10 parts of cotton are immediately thereafter introduced into the dye-bath and dyed for 45 minutes at 25 to 30° C., then oxidized, rinsed, acidified, rinsed and soaped at the boil. A strong blue dyeing is obtained which has good fastness properties.

A similar dyeing is obtained with the dyestuff prepared as described in Example 4 of German specification 719,-198, loc. cit., by condensing tetrabromoindigo with isophthaloyl chloride in pyridine with addition of copper powder, and also with the dyestuff prepared as described in Example 4 of German specification 697,431, loc. cit., from thioindigo and benzoic acid-meta-sulfochloride by condensation in pyridine with addition of copper powder.

*Example 4*

20 parts of the dyestuff used in Example 1 are dissolved in 900 parts of hot water with addition of 50 parts of urea, and the whole is then cooled to 30° C. and mixed with 100 parts of sodium hydroxide solution of 30% strength and 50 parts of sodium hydrosulfite. A cotton fabric is padded with this solution at 30° C. and the excess liquor is expressed until the weight of the fabric shows an increase of 50 to 100%. The dyed fabric is steamed for ½ to 2 minutes at 100 to 130° C. and then finished as described in Example 1.

*Example 5*

20 parts of the dyestuff used in Example 1 are mixed with 50 parts of urea and dissolved in 1000 parts of water. The solution is cooled to 30° C. and 30 parts of potassium carbonate and 40 parts of rongalite are added thereto. A cotton fabric is impregnated with this solution at 30° C., squeezed to a weight increase of 50 to 100%, dried at 60 to 100° C. and then steamed for 3 to 8 minutes in a Mather-Platt ager; finally the dyeing is finished as described in Example 1.

*Example 6*

A cotton fabric is impregnated with a dyestuff solution prepared as described in Example 1 and then dried. The fabric is then impregnated at 70 to 100° C. with a solution containing per liter 100 parts of sodium hydroxide solution of 30% strength and 60 parts of sodium hydrosulfite until its weight shows an increase of 50 to 140%. The padded fabric is then conveyed through a bath of molten metal (Wood's alloy) at a residence time of 2 to 20 seconds The dyeing is then finished as described in Example 1.

*Example 7*

A solution of 20 parts of the dyestuff used in Example 1 in 1000 parts of hot water is treated at 80° C. with 50 parts of sodium hydroxide solution of 30% strength and 20 parts of sodium hydrosulfite. A cotton fabric is impregnated with this solution to a weight increase of 100 to 140% and then passed through a melt of Wood's metal. The fabric is finally finished as described in Example 1.

*Example 8*

A mixture of 10 parts of dyestuff, 50 parts of urea and/or 50 parts of glycerol is dissolved with heating in 900 parts of water. The solution is cooled to about 30° C. and mixed with 100 parts of sodium hydroxide solution of 30% strength and 80 parts of rongalite. A cotton fabric is padded with this solution at about 30° C. until its weight shows an increase of 80 to 100%, and the padded fabric is exposed to humid heat with exclusion of air at a temperature ranging from 60 to 100° C. for ½ to about 4 hours. Finishing follows the procedure described in Example 1.

*Example 9*

A mixture of 10 parts of the dyestuff used in Example 1, 100 to 500 parts of urea and 50 to 200 parts of glycerol is dissolved in hot water and made up to 1000 parts, then cooled to 30° C. and mixed with 20 parts of potassium carbonate and 40 parts of rongalite. A cotton fabric is impregnated with this solution, dried, then heated for 1 to 5 minutes at 100 to 200° C., and finally finished as described in Example 1. If desired, the dyeing may be rinsed and soaped without first having been oxidized.

*Example 10*

A padding solution is prepared as described in Example 9, with the concomitant use of 100 parts of sodium alginate thickening of 5% strength. The material is padded, dried, and heated for 15 to 120 seconds at 180 to 210° C., and the dyeing is then finished as described in Example 1. The dyeing can, if desired, be rinsed and soaped without the additional treatment in an oxidizing bath. On cotton bluish green shades and on polyester fibers greenish blue shades of excellent fastness properties are obtained.

To produce a tone-in-tone shade, or two-tone effects, there may be applied together with the water-soluble vat dyestuff a dispersion dyestuff suitable for this purpose.

*Example 11*

0.15 part of the water-soluble dyestuff, prepared as described in German specification 697,431, loc. cit., Example 5, by condensing dimethoxydibenzanthrone with the inner anhydride of ortho-sulfobenzoic acid with addition of copper powder, are dyed as described in Example 2, but at 80° C. A strong green dyeing is obtained having excellent fastness properties.

A dyestuff with very similar properties is obtained when for making the dyestuff described in Example 1 of the afore-mentioned specification benzoic acid-para-sulfochloride is used instead of benzoic acid-meta-sulfochloride.

*Example 12*

0.3 part of the water-soluble dyestuff, prepared by condensing dimethoxydibenzanthrone with benzoic acid-3:5-disulfochloride in pyridine with addition of copper powder, is used for dyeing by the process according to Example 2. A strong green dyeing is obtained which has excellent fastness properties.

The dyestuff may be prepared as follows: 57.5 parts of benzoic acid-3:5-disulfochloride and 20 parts of dimethoxydibenzanthrone are added to 350 parts of pyridine under nitrogen, the mixture is heated to 90° C., 36 parts of copper powder are added within 1 hour, and the whole is maintained at 95° C. until the product dissolves completely in cold dilute sodium carbonate solution. While still hot, the excess copper powder is filtered off and the filtrate is slowly poured into a mixture of 2000 parts of ice, 700 parts of water and 500 parts of concentrated hydrochloric acid, whereupon a red product precipitates; the whole is kept overnight and then filtered. The filter cake is suspended in 300 parts of water, adjusted to pH=7 with dilute sodium hydroxide solution, and 20 parts of sodium hydrosulfide solution of 30% strength are slowly added. The resulting red solution is evaporated at 40° C. under vacuum.

*Example 13*

14 parts of the water-soluble dyestuff of the formula

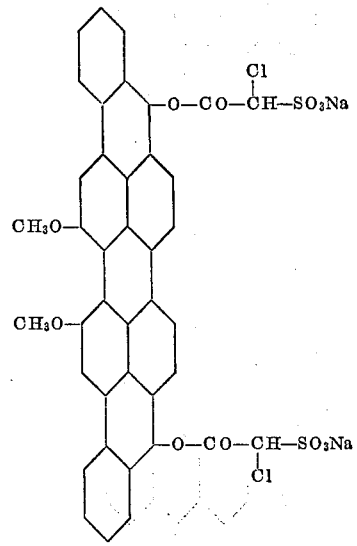

(prepared according to Example 1 of U.S. specification 2,765,309, to Wilhelm Eckert et al., issued October 2, 1956, by condensing dimethoxydibenzanthrone in pyridine with acylation mixture obtained by reacting para-toluenesulfonyl chloride with crude sulfochloracetic acid in pyridine at 40° C. after reduction with iron powder) are used for dyeing by the process described in Example 1. A strong green dyeing is obtained which has excellent fastness properties.

Dyeing may be performed in identical manner with the dyestuffs solubilized as described in Example 8 of U.S. specification 2,765,309, loc. cit., corresponding to the following formulae

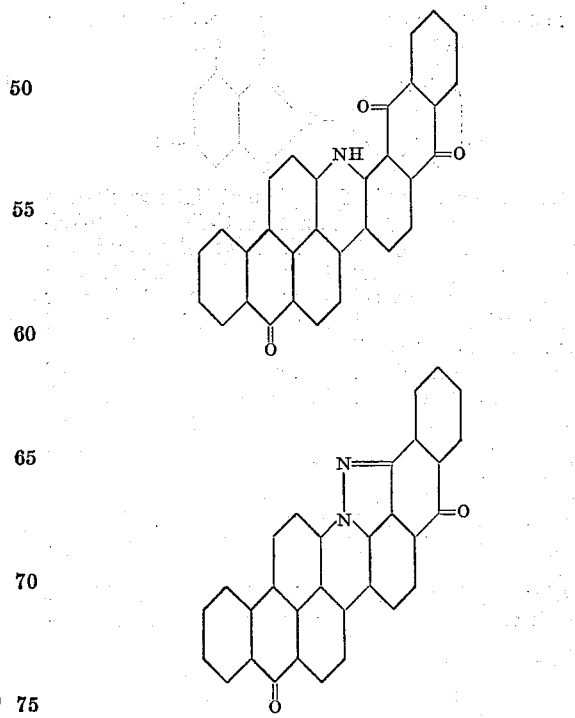

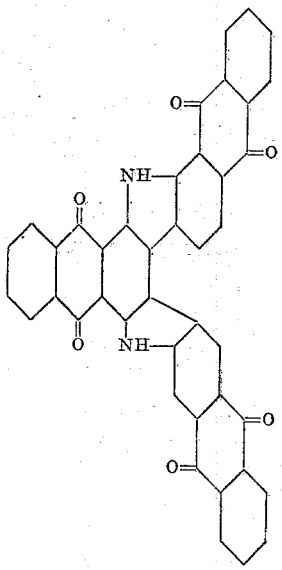

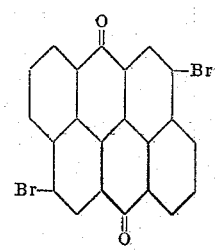

Dyeing in an identical manner may also be performed with the water-soluble dyestuffs prepared as described in Examples 1 and 8 of German specification 967,136, issued October 10, 1957, to Farbwerke Hoechst A.G., Frankfurt am Main, Germany, by condensing dimethoxy-dibenzanthrone or benzanthrone-pyrazoleanthrone with the chloromethylate of the dimethylaminoacetyl chloride after reduction with iron powder.

*Example 14*

0.3 part of the water-soluble dyestuff of the formula

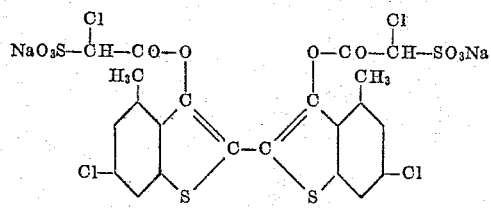

(prepared as described in Example 6 of U.S. specification 2,765,309, loc. cit., by condensing 4:4'-dimethyl-6:6'-dichlorothioindigo in pyridine with the acetylation mixture obtained by reacting para-toluenesulfonylchloride with crude sulfochloracetic acid in pyridine at 40° C., after reduction with iron powder) is dissolved in 50 parts of water heated to 50° C. The resulting solution is poured into a solution heated to 50° C. of 2 parts by volume of sodium hydroxide solution of 30% strength and 1.2 parts of sodium hydrosulfite in 350 parts of water; 10 parts of cotton are immediately immersed in this dyebath and dyed for 45 minutes at 50° C. with addition of 8 parts of sodium chloride. The cotton is then oxidized in the usual manner, acidified and soaped at the boil. A strong pink dyeing is obtained which has excellent fastness properties.

Dyeing may be performed in identical manner with the dyestuffs obtained as described in Example 7 and in Example 5 of the afore-mentioned specification, except that a temperature of 30° C. is used and an addition of 12 parts of sodium chloride is made. These dyestuffs are prepared as described above from 5:5'-dichloro-7:7'-dimethylthioindigo with sulfochloracetic acid, and from dibromodibenzpyrenequinone with sulfochloracetic acid respectively.

*Example 15*

0.3 part of the water-soluble dyestuff prepared as described in Example 2 of German specification 720,790, issued May 15, 1942, to I. G. Farbenindustrie A.G., Frankfurt am Main, Germany, by condensing an alkaline hydrosulfite vat of dimethoxydibenzanthrone with benzoic acid-meta-sulfochloride with addition of the product formed by condensing 1 molecular proportion of oleyl alcohol with about 20 molecular proportions of ethylene oxide, is used for dyeing according to Example 2. A strong green dyeing is obtained which has excellent properties of fastness.

Identical dyeings are obtained with the dyestuffs prepared as described in Example 5 of German specification 720,790, loc. cit., and, respectively, in Example 1 of German specification 741,053, issued November 3, 1943, to I. G. Farbenindustrie A.G. Frankfurt am Main, Germany, by condensing an alkaline hydrosulfide vat of dimethoxydibenzanthrone with the inner anhydride of orthosulfobenzoic acid with addition of the condensation product of naphthalene-2-sulfonic acid with formaldehyde, said dyestuffs being applied as described in Example 5.

*Example 16*

0.3 part of the dyestuff of the probable formula

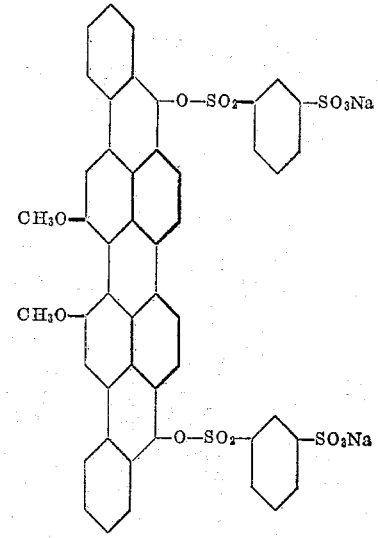

is used for dyeing as described in Example 2; a strong green dyeing is obtained which has excellent fastness properties.

The dyestuff may be prepared in the following manner:

A paste consisting of 5 parts of Bz-2:Bz-dimethoxydibenzanthrone, 10 parts of an aqueous solution of 20% strength of the condensation product from 1 molecular proportion of oleyl alcohol and about 20 molecular proportions of ethylene oxide, and 5 parts of water, was diluted with 190 parts of water and 40 parts of an aqueous solution of 20% strength of the above-mentioned condensation product. 40 parts of sodium hydroxide solution of 30% strength and 7 parts of sodium hydrosulfite were then added and vatting was performed at 50° C. under a current of nitrogen (duration about 30 minutes). The blue vat was then cooled to 0°–5° C. and in the course of 45 minutes a solution of 25 parts of benzenedisulfonyl chloride-1:3 in 30 parts of acetone was added dropwise. During this operation the temperature did not rise above 5° C. After a short time the reaction mixture turned red. The reaction mixture should be kept slightly alkaline up to the end of the reaction, if required by adding sodium hydroxide solution. On completion of the reaction the undissolved material was filtered off, the leuco ester was salted out with sodium chloride, suctioned off and dried at 40° C. under vacuum.

*Example 17*

0.3 part of the dyestuff prepared as described in Example 8 of German specification 720,790, loc. cit., by condensing an alkaline aqueous hydrosulfite vat of flavanthrone with the inner anhydride of ortho-sulfobenzoic acid, with addition of the condensation product from 1 molecular proportion of oleyl alcohol and about 20 molecular proportions of ethylene oxide, is used for dyeing as described in Example 2. A yellow dyeing is obtained which has good fastness properties.

*Example 18*

A printing paste of the following composition is prepared:

20 parts of the dyestuff used in Example 1
200 parts of water
700 parts of potash thickening
80 parts of rongalite
———
1000 parts Composition of the potash thickening:

90 parts of wheat starch
90 parts of cold water
100 parts of glycerine
140 parts of powdered British gum
170 parts of tragacanth mucilage 60/1000
170 parts of potash
240 parts of water
———
1000 parts The printing paste is used for printing a cotton or cellulose wool fabric by means of a roller printing machine. The fabric is then dried and steamed for 8 minutes at 100° C. in a Mather-Platt apparatus. The rest of the procedure is as usual. A powerful green print with excellent fastness properties is obtained.

What is claimed is:

1. A process for dyeing and printing cellulose textile materials with a leuco-vat dyestuff in which the hydroxyl groups formed by reducing the keto-groups are esterified with an organic acid of which the acyl radical contains at least one group imparting solubility in water to the dyestuff, wherein, at any stage of the dyeing and printing process prior to the oxidation, the ester of the leuco-vat dyestuff is treated with an alkali and a strong reducing agent.

2. A process as claimed in claim 1, wherein the leuco-vat dyestuff used contains as acyl radical the radical of a lower aliphatic carboxylic acid having a sulfonic acid group.

3. A process as claimed in claim 1, wherein the leuco-vat dyestuff used contains as acyl radical a member selected from the group consisting of an arylcarboxylic and an arylsulfonic acid radical having 1 to 2 sulfonic acid groups.

4. A process as claimed in claim 1, wherein the leuco-vat dyestuff used contains as acyl radical the radical of a heterocyclic carboxylic acid having a sulfonic acid group.

5. A process as claimed in claim 1, wherein the leuco-vat dyestuff used contains as acyl radical the radical of the formula

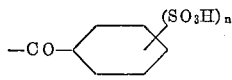

in which $n$ is a whole number from 1 to 2.

6. A process as claimed in claim 1, wherein the leuco-vat dyestuff used contains as acyl radical the radical of the formula

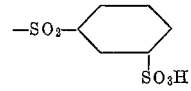

7. A process as claimed in claim 1, wherein the textile material is padded with an aqueous solution of the leuco-vat dyestuff ester, and the padded material is treated with an aqueous solution of an alkali and a strong reducing agent and then subjected to a heat-treatment.

8. A process as claimed in claim 1, wherein the textile material is padded with an aqueous solution containing the leuco-vat dyestuff ester, an alkali and a strong reducing agent, and the padded material is subjected to a heat-treatment.

9. A process as claimed in claim 1, wherein the textile material is immersed at a temperature between 20° to 90° C. in an aqueous solution containing the leuco-vat dyestuff ester, an alkali hydroxyl and a strong reducing agent.

10. A process as claimed in claim 1, wherein the strong reducing agent is a hydrosulfite.

11. A process as claimed in claim 1, wherein there is used the dyestuff of the formula

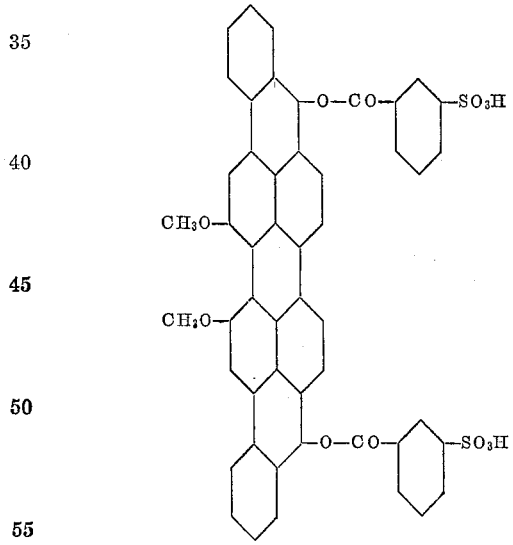

12. A cellulose textile material which has been colored by the process claimed in claim 1.

References Cited in the file of this patent
UNITED STATES PATENTS

| | | |
|---|---|---|
| 2,095,600 | Graenacher et al. | Oct. 12, 1937 |
| 2,235,480 | Graenacher et al. | Mar. 18, 1941 |
| 2,256,808 | Kern | Sept. 23, 1941 |
| 2,447,993 | Vierira | Aug. 24, 1948 |
| 2,487,197 | Stott et al. | Nov. 8, 1949 |
| 2,749,341 | Staeuble | June 5, 1956 |